UNITED STATES PATENT OFFICE.

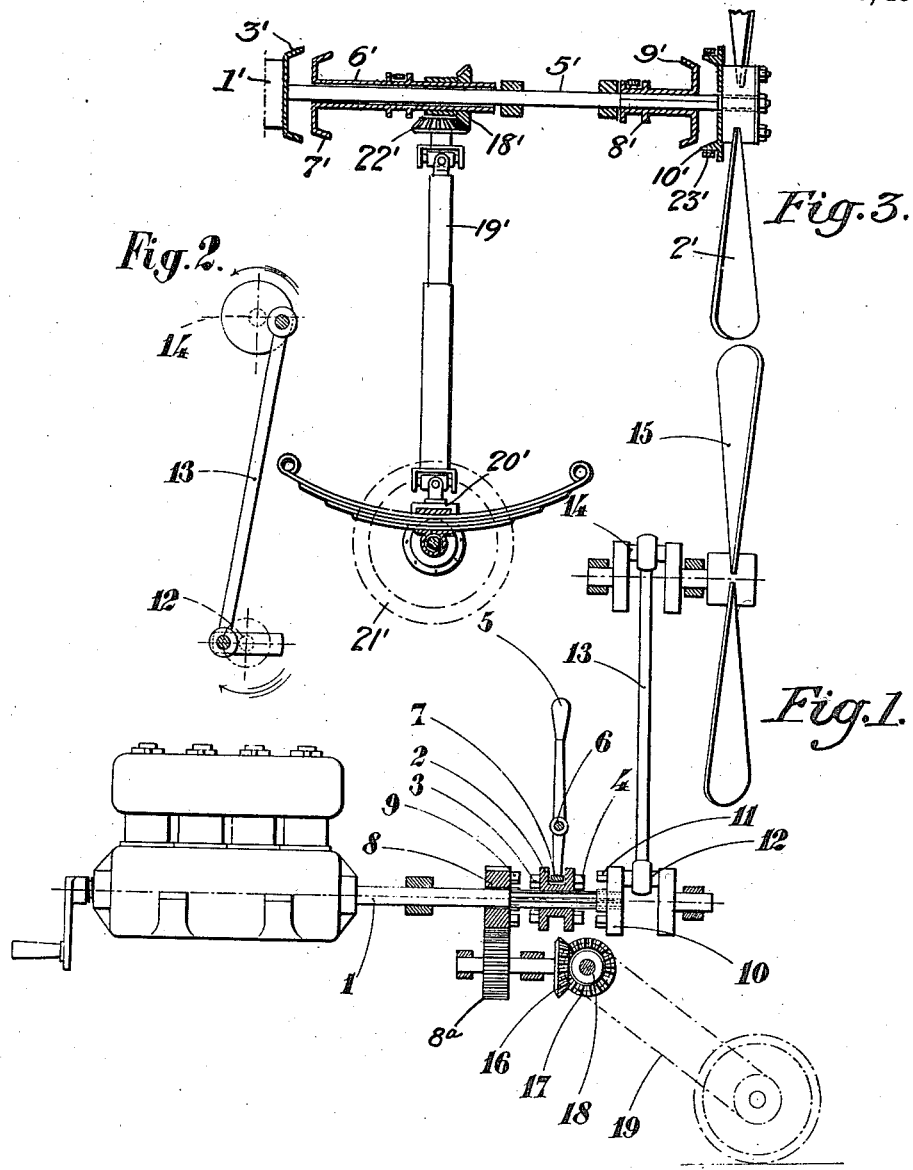

RENÉ TAMPIER, OF PARIS, FRANCE.

AERIAL APPARATUS.

1,044,945.	Specification of Letters Patent.	Patented Nov. 19, 1912.

Application filed August 14, 1911. Serial No. 643,898.

*To all whom it may concern:*

Be it known that I, RENÉ TAMPIER, a citizen of the French Republic, residing at Paris, Department of the Seine, in France, have invented certain new and useful Improvements in Aerial Apparatus; and I hereby declare the following to be a full, clear, and exact description of the invention, such as will enable others skilled in the art to which it appertains to make and use the same.

This invention relates to improvements in propelling mechanism for aeroplanes or the like, and has particular reference to that type of mechanism which is adapted to transmit power from the same source to either of two means of propulsion.

The object of the present invention is to provide such a mechanism of improved type in which the power from a given source can be directly transmitted to one propelling element or to a second propelling element. A further object is to so arrange the parts that this change in transmission can be effected by a simple operation.

When the invention is applied to an aeroplane as in the present case, it consists broadly in providing a clutch member capable of partaking of the rotation of a driving shaft in which it is slidingly mounted and which is adapted, when in one position, to transmit power to the traction wheels and when in another position, to transmit power to the propeller.

The invention is illustrated in the accompanying drawings, in which:

Figure 1 is a side elevation of a transmission mechanism applied to an aeroplane and embodying the invention, certain parts being shown in section. Fig. 2 is a detail view, showing how the motion is transmitted from the driving shaft to the propeller shaft. Fig. 3 shows a modification of Fig. 1 in which the propeller is mounted directly on the driving shaft and in which a slightly different form of traction wheel propelling mechanism is used.

In these several views, like reference characters refer to corresponding parts.

Referring to Fig. 1, the driving shaft 1 driven by any suitable source of power, carries at a convenient location a clutch member 2 which may be mounted on the shaft in any convenient manner, so that it will partake of the rotation of the shaft, but will be capable of sliding therealong. Preferably, this result is obtained by making the shaft at this point square, as shown in the figure. The clutch member 2 is provided on one face with the teeth 3 and on the opposite face with the teeth 4. The clutch can be shifted along the shaft 1 by any suitable means, such as the hand lever 5 pivoted at 6 and carrying at its lower end a fork or lug 7, which engages an annular recess in the member 2.

Adjacent the clutch member and loosely mounted on the same shaft is a gear 8 carrying teeth 9 which are adapted to engage with the adjacent teeth 3 of the clutch member. The gear 8 acts as a driving gear for the traction mechanism which may simply consist of a gear 8ª meshing with the loosely mounted gear 8. The shaft upon which it is mounted carries a beveled gear 16 meshing with a beveled gear 17 carried by a shaft 18 to which a suitable sprocket is attached, to drive the chain 19 to the traction wheels. When the propeller cannot be mounted directly on the driving shaft 1ª, disk 10 is loosely mounted on the extremity of the shaft 1 which serves as one of the crank arms for the crank pin 12. This disk carries on its face adjacent the clutch member a number of teeth 11 adapted to engage with the teeth 4 of said member. The propeller 15 is mounted on a crank shaft 14 and a pitman 13 connects the crank shaft 14 with the crank pin 12.

The operation of such a mechanism is as follows: When it is desired to transmit the power to the wheels, the lever 5 is thrown to the right thereby sliding clutch member 2 along the shaft 1 until the teeth 3 engage with the teeth 9 of the loose gear 8. As the clutch always partakes of the rotation of the shaft, this rotation will be transmitted to the gear 8 and then to the driving wheels. If the lever 5 is thrown to the left, however, the teeth 4 will engage with teeth 11 and motion will be transmitted to the propeller 15.

Fig. 3 shows a manner of arranging the parts when the propeller can be mounted directly on the driving shaft. The transmission mechanism in this case is especially applicable where the motor itself rotates. 1′ designates a portion of the casing of such a rotating motor and 3′ a clutch member secured rigidly thereto. Obviously, this member could be secured to the shaft 5' and the same result would be obtained. Loosely mounted on the driving shaft 5' is a sleeve 6' carrying a clutch member 7' to coöperate with the adjacent clutch member 3'. Secured to the other end of the sleeve 6' is a beveled gear 18'. Adapted to mesh with gear 18' is a beveled gear 22' which transmits motion through suitable cardan joints and the driving shaft 19' to the axle 20' of the driving wheels 21'.

A second sleeve 8' keyed to the shaft 5' carries a clutch member 9' adapted to engage with a clutch member 10' which is carried by the propeller, as shown. The propeller is loosely mounted on the shaft 5' and to stop its rotation when the clutch is thrown out, a brake 23' may be employed. The two sleeves 6' and 8' are preferably operated simultaneously by any suitable mechanism.

When the sleeves are thrown to the left the clutch members 3' and 7' will engage, sleeve 6' will rotate and through the gear 18', which is then in mesh with beveled gear 22', will transmit power to the driving wheels. If the sleeves be shifted in the opposite direction, the clutch member 9' which is continually rotating with the shaft 5', will engage with clutch member 11' to rotate the propeller. It is to be noted that the shifting of the sleeve 6' to the right will unmesh the gears 18' and 22', as well as throwing said sleeve out of operative engagement with clutch 3'.

It is seen therefore that in a construction as described, a minimum amount of mechanism can be employed and the simplicity thereof allows of a good substantial construction.

What I claim is:—

1. In a transmission mechanism for aeroplanes and the like, a driving shaft, a propeller loosely mounted thereon, a sleeve keyed to said shaft provided with a clutch member, a second sleeve loosely mounted on said shaft provided with a clutch member, a clutch member carried by said shaft to coöperate therewith, a gear mounted on said sleeve, driving wheels adapted to be driven by said gear, and means to shift said sleeves so that the last named clutch member will rotate the loosely mounted sleeve and hence the driving wheels, or so that the keyed sleeve will rotate said propeller.

2. In a transmission mechanism for aeroplanes and the like, a driving shaft, a sleeve loosely mounted on said shaft, clutch mechanism associated with said sleeve and said shaft, a beveled gear in said sleeve, driving wheels adapted to propel the aeroplane on land, and means to drive the same comprising a vertically disposed shaft adapted to be driven by said beveled gear, a propeller loosely mounted on said driving shaft, a clutch sleeve keyed to said shaft and adapted to rotate said propeller, and means to shift said sleeves to control the operation of said driving wheels and propeller.

In testimony whereof I affix my signature, in presence of two witnesses.

RENÉ TAMPIER.

Witnesses:
 H. C. COXE,
 LOUIS JOSSE.